United States Patent
Straub

(10) Patent No.: US 9,121,330 B2
(45) Date of Patent: Sep. 1, 2015

(54) PORTING SYSTEM FOR A TURBO-CHARGED LOOP SCAVENGED TWO-STROKED ENGINE

(71) Applicant: GM Global Technology Operations LLC, Detroit, MI (US)

(72) Inventor: Robert D. Straub, Lowell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 54 days.

(21) Appl. No.: 13/838,401

(22) Filed: Mar. 15, 2013

(65) Prior Publication Data

US 2014/0261261 A1 Sep. 18, 2014

(51) Int. Cl.
| | |
|---|---|
| F02B 25/00 | (2006.01) |
| F02B 33/00 | (2006.01) |
| F02B 25/14 | (2006.01) |
| F02B 33/44 | (2006.01) |
| F01N 13/10 | (2010.01) |
| F02B 37/18 | (2006.01) |
| F02B 25/02 | (2006.01) |
| F02B 75/02 | (2006.01) |

(52) U.S. Cl.
CPC .............. *F01N 13/107* (2013.01); *F02B 25/02* (2013.01); *F02B 33/44* (2013.01); *F02B 37/18* (2013.01); *F01N 2240/36* (2013.01); *F01N 2260/06* (2013.01); *F01N 2260/08* (2013.01); *F02B 25/14* (2013.01); *F02B 2075/025* (2013.01); *Y02T 10/144* (2013.01)

(58) Field of Classification Search
CPC .. F02B 75/025; F02B 25/00; F02B 2700/037; F02B 41/10; F02B 37/005; F02B 63/04; F02B 33/22; F02B 41/06; F02B 25/14; F02M 25/0707; F02M 25/0713; F02M 25/0727; F21F 1/22
USPC ...... 123/65 R, 68, 65 P; 60/597, 605.2, 605.1
See application file for complete search history.

(56) References Cited

U.S. PATENT DOCUMENTS

| | | | | |
|---|---|---|---|---|
| 6,276,139 | B1 * | 8/2001 | Moraal et al. ................ | 60/605.2 |
| 8,627,659 | B2 * | 1/2014 | Straub ............................ | 60/602 |
| 8,677,749 | B2 * | 3/2014 | Laimboeck et al. ......... | 60/605.1 |
| 2002/0112681 | A1 * | 8/2002 | Rosskamp et al. .......... | 123/73 R |
| 2006/0021346 | A1 * | 2/2006 | Whelan et al. ............... | 60/605.2 |

FOREIGN PATENT DOCUMENTS

DE  10235134 A1  2/2004

* cited by examiner

*Primary Examiner* — Lindsay Low
*Assistant Examiner* — Syed O Hasan
(74) *Attorney, Agent, or Firm* — Cantor Colburn

(57) ABSTRACT

A porting system for a turbo-charged loop scavenged two-stroke engine includes a cylinder including a cylinder wall and a cylinder head. At least one inlet port is provided in the cylinder wall. The at least one inlet port is arranged a first distance from the cylinder head and fluidically connected to a compressor portion of a turbo-charger. A first exhaust port is provided in the cylinder wall. The first exhaust port is arranged a second distance from the cylinder head and is fluidically connected to a turbine portion of the turbo-charger through first exhaust passage. A second exhaust port is provided in the cylinder wall. The second exhaust port is arranged a third distance from the cylinder head that is greater than the second distance and the second exhaust passage is fluidically connected to a second exhaust passage bypassing the turbine portion.

18 Claims, 4 Drawing Sheets

PORTING SYSTEM FOR A TURBO-CHARGED LOOP SCAVENGED TWO-STROKED ENGINE

FIELD OF THE INVENTION

The subject invention relates to the art of loop scavenged two-stroke engines and, more particularly, to a porting system for a turbo-charged loop scavenged two-stroke engine.

BACKGROUND

Generally, internal combustion engines take two forms, four-stroke systems or two-stroke systems. In a four stroke system, a combustion process occurs through four piston strokes. Namely, (1) an intake stroke during which a piston moves within a cylinder to draw in an air/fuel mixture, (2) a compression stroke during which the air/fuel mixture is compressed between the piston and a cylinder head, (3) a power stroke during which combustion of the air/fuel mixture drives the piston along the cylinder to create work, and (4) an exhaust stroke during which exhaust gases resulting from combustion are expelled from the cylinder. In contrast, in a two-stroke system, the four parts of the combustion process are condensed to two piston strokes, (1) an intake/compression stroke and (2) a power/exhaust stroke. Two-stroke petrol (gas) engines are generally employed with high-power, hand-held applications such as lawn mowers, trimmers, outboard motors, motorcycles and chain saws. Diesel engines rely on heat produced during compression to ignite a fuel/air mixture. Two stroke diesel engines are used in many large industrial and marine applications Loop scavenged two-stroke diesel engines employ transfer ports that are shaped and positioned to direct a fresh mixture of air/fuel toward the combustion chamber. The air/fuel mixture strikes the cylinder head, follows a curvature of the combustion chamber, and is then deflected downward. The downward deflection prevents the fuel/air mixture from traveling directly out of the exhaust port along with the exhaust gases and also creates a swirling turbulence that improves combustion efficiency, power and economy. In a turbo-charged loop scavenged two-stroke diesel engine, during the power/exhaust stroke, compressed air from a compressor portion of a turbocharger is guided into the combustion chamber through an inlet port. The compressed air helps drive exhaust gases through an exhaust port as well as mixing with fuel during the intake/compression stroke to contribute to the combustion process.

During a portion of the power/exhaust stroke, the exhaust gases loose pressure and thus contribute very little to driving the turbine portion of the turbocharger. Further, at the lower pressure, the exhaust gases often times may reduce turbine/engine operational efficiency. Accordingly, it is desirable to provide a system that redirects exhaust gases from the turbine portion of the turbo-charger during a portion of the power/exhaust stroke of the piston.

SUMMARY OF THE INVENTION

In accordance with an exemplary embodiment, a porting system for a turbo-charged loop scavenged two-stroke diesel engine includes a cylinder including a cylinder wall and a cylinder head. At least one inlet port is provided in the cylinder wall. The at least one inlet port is arranged a first distance from the cylinder head and fluidically connected to a compressor portion of a turbo-charger. A first exhaust port is provided in the cylinder wall. The first exhaust port is arranged a second distance from the cylinder head and is fluidically connected to a turbine portion of the turbo-charger through a first exhaust passage. A second exhaust port is provided in the cylinder wall. The second exhaust port is arranged a third distance from the cylinder head that is greater than the second distance. The second exhaust port is fluidically connected to a second exhaust passage bypassing the turbine portion.

In accordance with another exemplary embodiment, a method of operating a turbo-charged loop scavenged two-stroke diesel engine includes passing a first portion of exhaust gases at a first pressure through a first exhaust port formed in a cylinder wall of a cylinder, guiding the first portion of the exhaust gases to a turbine portion of a turbocharger through a first exhaust passage, passing another portion of the exhaust gases at a second pressure lower than the first pressure through a second exhaust port formed in the cylinder wall, and guiding the second portion of the exhaust gases through a second exhaust passage bypassing the turbine portion.

In accordance with yet another exemplary embodiment, a turbo-charged loop scavenged two-stroke diesel engine includes a turbo-charger having a compressor portion and a turbine portion. The turbine portion is fluidically connected to an exhaust path. An engine block includes a piston cylinder fluidically connected to the turbo-charger. The piston cylinder includes a cylinder wall and a cylinder head that define, at least in part, a combustion chamber. A piston is slidingly arranged within the piston cylinder. At least one inlet port is provided in the cylinder wall. The at least one inlet port is arranged a first distance from the cylinder head and fluidically connected to the compressor portion. A first exhaust port is provided in the cylinder wall. The first exhaust port is arranged a second distance from the cylinder head and fluidically connected to the turbine portion through a first exhaust passage. A second exhaust port is provided in the cylinder wall. The second exhaust port is arranged a third distance from the cylinder head that is greater than the second distance. The second exhaust port is fluidically connected to a second exhaust passage bypassing the turbine portion.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
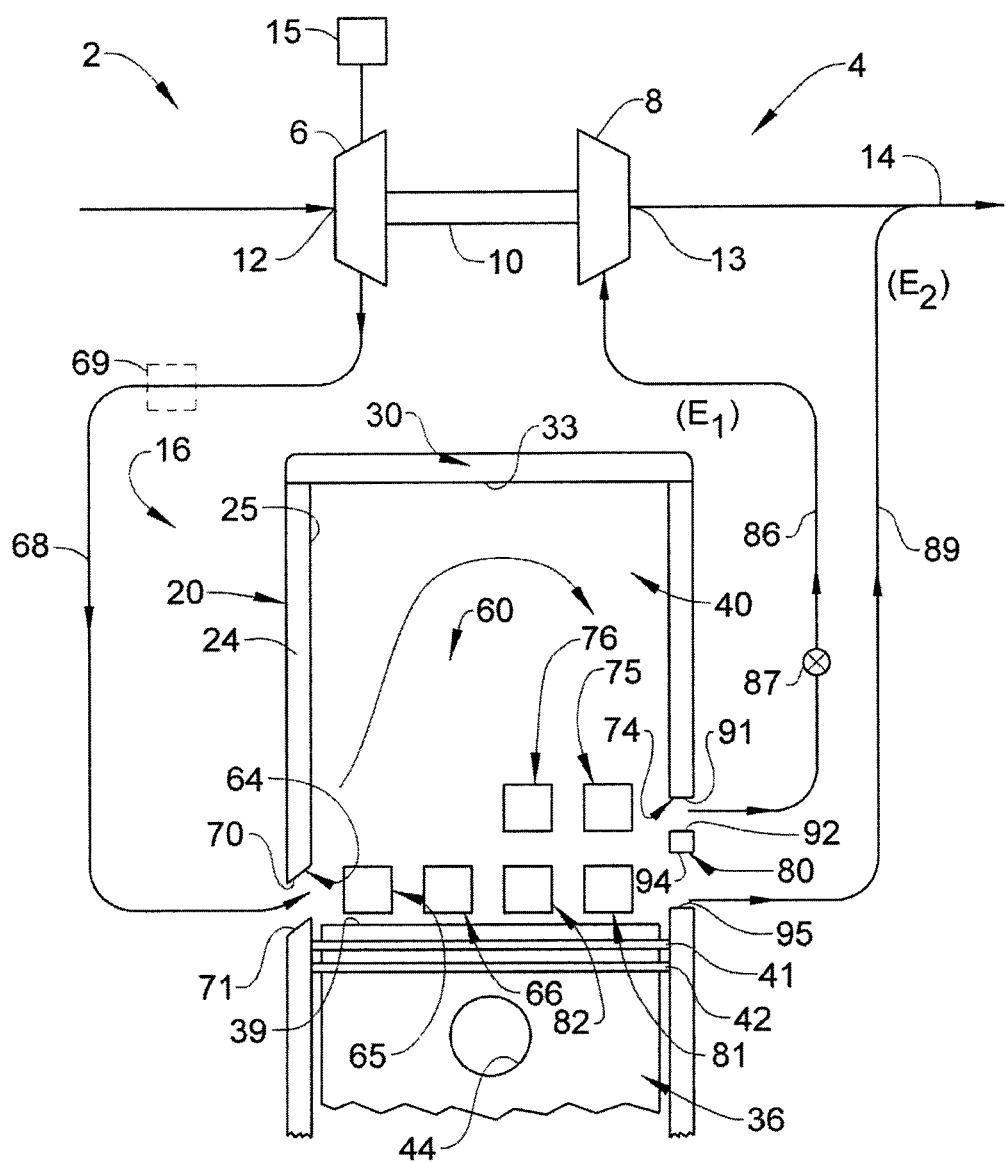
FIG. 1 depicts a schematic plan view of a porting system for a turbo-charged loop scavenged two-stroke diesel engine in accordance with an exemplary embodiment.

A turbo-charged loop scavenged two-stroke diesel engine in accordance with an exemplary embodiment is indicated generally at 2 in FIG. 1. Turbo-charged loop scavenged two-stroke diesel engine 2 includes turbo-charger 4 having a compressor portion 6 coupled to a turbine portion 8 through a shaft 10. Compressor portion 6 includes an inlet 12 that receives air and turbine portion 8 includes an outlet 13 that is fluidically connected to an exhaust passage or path 14. Compressor portion 6 is also linked to a supplemental drive member 15. Supplemental drive member 15 may take the form of an electric, a hydraulic, or mechanical drive that provides input power to compressor portion 6 during start-up of turbo-charged loop scavenged two-stroke diesel engine 2. Turbo-charged loop scavenged two-stroke diesel engine 2 also includes an engine block 16 having one or more piston cylinders, one of which is shown at 20. The following description is merely exemplary in nature and is not intended to limit the present disclosure, its application or uses. It should be understood that throughout the drawings, corresponding reference numerals indicate like or corresponding parts and features.

In accordance with an exemplary embodiment, piston cylinder 20 includes a cylinder wall 24 having an inner surface 25 and a cylinder head 30 having an inner surface portion 33. A piston 36 shifts within piston cylinder 20. Piston 36 includes a pair of piston rings 41 and 42 and a wrist pin opening 44. Inner surface 25, inner surface portion 33 and outer surface 39 of piston 36 collectively define a combustion chamber 40. Piston rings 41 and 42 provide a seal between piston 36 and inner surface 25 that limits passage of compression gases from combustion chamber 40 while at the same time enabling the passage of some lubricant for lubrication purposes. Wrist pin opening 44 accepts a wrist pin (not shown) that joins piston 36 to a connecting rod (also not shown). The connecting rod is coupled to a crankshaft (not shown) that provides a driving force which moves piston 36 within piston cylinder 20.

Piston cylinder 20 also includes a porting system 60. As will be discussed more fully below, porting system 60 guides air and fuel into piston cylinder 20, and exhaust gases from piston cylinder 20. Porting system 60 includes a plurality of inlet ports, three of which are shown at 64, 65 and 66. Inlet ports 64-66 are fluidically connected to an inlet passage 68. Inlet passage 68 is fluidically connected to compressor portion 6 and delivers compressed air into piston cylinder 20 and may include an intercooler 69. If provided, intercooler 69 lowers a temperature of air passing from compressor portion 6 into piston cylinder 20. Inlet port 64 extends from a first end 70 to a second end 71 defining an opening (not separately labeled) having a first area for inputting compressed air, as will be detailed more fully below. Inlet ports 65 and 66 include similar geometry. Porting system 60 also includes a plurality of first exhaust ports, three of which are indicated at 74, 75 and 76 and a plurality of second exhaust ports, three of which are indicated at 80, 81 and 82.

In accordance with an exemplary embodiment, first exhaust ports 74-76 are fluidically connected to a first exhaust passage 86. First exhaust passage 86 is fluidically connected to turbine portion 8. In accordance with an aspect of the exemplary embodiment, first exhaust passage 86 may be provided with a valve 87. Valve 87 is selectively closed to provide additional compression particularly during start-up of turbo-charged loop scavenged two-stroke diesel engine 2. Second exhaust ports 80-82 are fluidically connected to a second exhaust passage 89 that bypasses turbine portion 8. First exhaust port 74 extends from a first end portion 91 to a second end portion 92 defining an opening (not separately labeled) having a second area for passing exhaust gases to turbine portion 8. First exhaust ports 75 and 76 include similar geometry. Second exhaust port 80 extends from a first end portion 94 to a second end portion 95 defining an opening (also not separately labeled) having a third area for passing exhaust gases to exhaust path 14. In accordance with an aspect of the exemplary embodiment, the second area is smaller than both the first area and the third area. The third area may be equal to, or smaller than, the first area. First exhaust ports 74-76 are arranged at a first distance from cylinder head 30. Second exhaust ports 80-82 are arranged at a second distance from cylinder head 30 that is greater than the first distance.

Inlet ports 64-66 pass compressed air into piston cylinder 20. Piston 36 moves to a top dead center (TDC) position compressing the air. Fuel is injected and mixed near TDC forming a combustible mixture. Heat resulting from compressing the air ignites the combustible mixture. The combustible mixture burns/expands driving piston 36 toward a bottom dead center (BDC) position in piston cylinder 20. As piston 36 travels in response to the combustion gases, first exhaust ports 74-76 are exposed. A first portion of the combustion gases at a first pressure pass through first exhaust ports 74-76 to drive turbine portion 8. The second area of first exhaust ports 74-76 acts as a nozzle further enhancing the pressure of the first portion of combustion gases passing to turbine portion 8. As piston 36 continues to travel, and the combustion gases loose pressure or momentum, second exhaust ports 80-82 are uncovered allowing a second or remaining portion of the combustion gases at a second pressure that is lower than the first pressure to pass to exhaust path 14 bypassing turbine portion 8. In this manner, combustion/exhaust gases at a lower pressure are not guided toward turbine portion 8 but rather are allowed to freely flow from turbo-charged loop scavenged two-stroke diesel engine 2 through exhaust path 14. Guiding the lower pressure exhaust/combustion gases directly through exhaust path 14 enhances engine efficiency by reducing back pressure which the compressor may work against for flow scavenging air through the cylinder.

Figure 2:
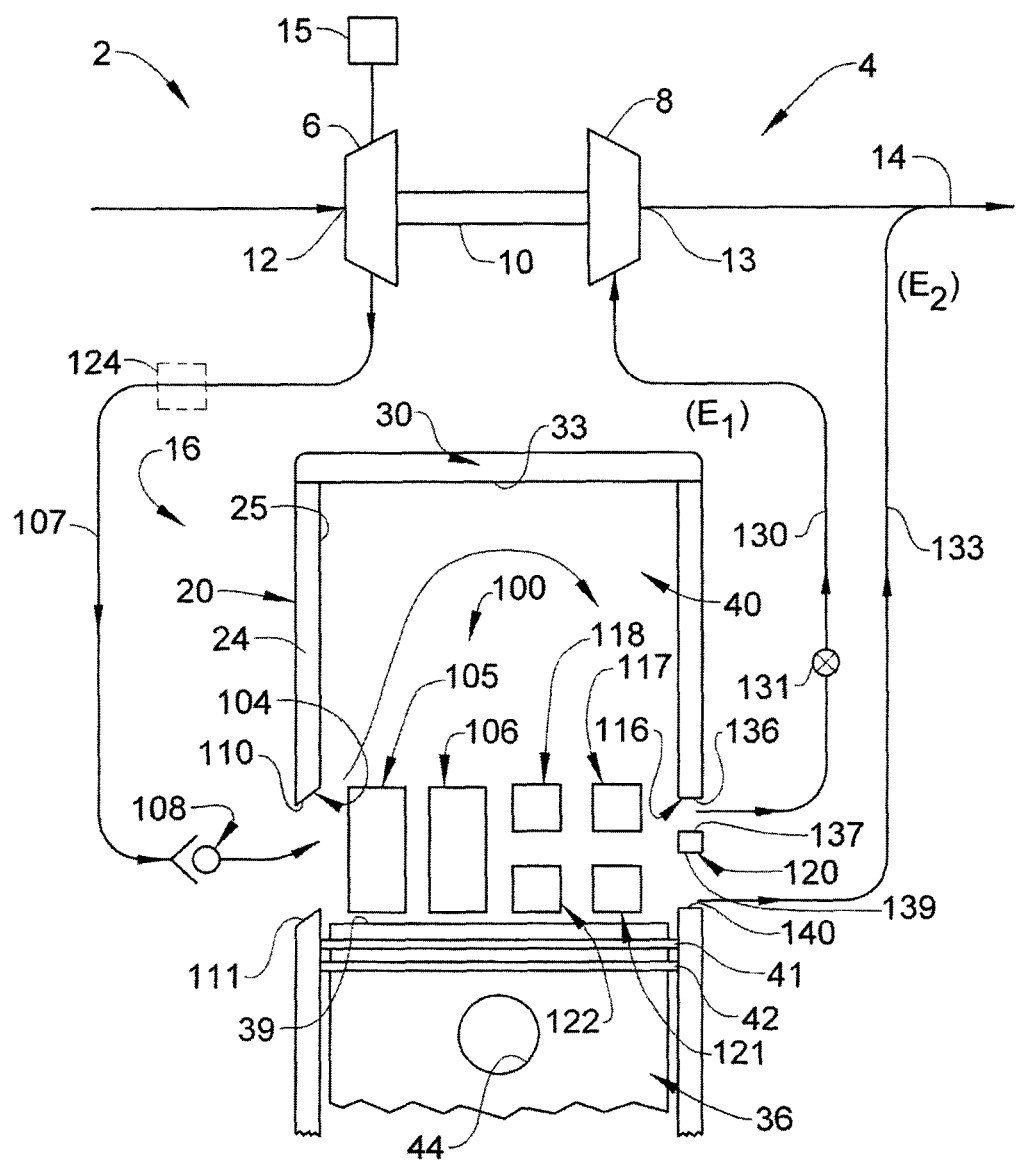
FIG. 2 depicts a schematic plan view of a porting system for a turbo-charged loop scavenged two-stroke diesel engine in accordance with another aspect of the exemplary embodiment.

Reference will now follow to FIG. 2, wherein like reference numbers represent corresponding parts in the respective views, in describing a porting system 100 in accordance with another aspect of the exemplary embodiment. Porting system 100 includes a plurality of inlet ports, three of which are shown at 104, 105 and 106. Inlet ports 104-106 are fluidically connected to an inlet passage 107 having a one-way check valve 108. Inlet passage 107 is fluidically connected to compressor portion 6 and delivers compressed air into piston cylinder 20. Inlet port 104 extends from a first end 110 to a second end 111 defining an opening (not separately labeled) having a first area for inputting compressed air. Inlet ports 105 and 106 include similar geometry. Porting system 100 also includes a plurality of first exhaust ports, three of which are indicated at 116, 117 and 118 and a plurality of second exhaust ports, three of which are indicated at 120, 121 and 122. Inlet passage 107 may include an intercooler 124. If provided, intercooler 69 lowers a temperature of air passing from compressor portion 6 into piston cylinder 20

In accordance with the exemplary aspect shown, first exhaust ports 116-118 are fluidically connected to a first exhaust passage 130 which is fluidically connected to turbine portion 8. In accordance with an aspect of the exemplary embodiment, first exhaust passage 130 may be provided with a valve 131. Valve 131 is selectively closed to provide additional compression particularly during start-up of turbo-charged loop scavenged two-stroke diesel engine 2. Second exhaust ports 120-122 are fluidically connected to a second exhaust passage 133 that bypasses turbine portion 8. First exhaust port 116 extends from a first end portion 136 to a second end portion 137 defining an opening (not separately labeled) having a second area for passing exhaust gases to turbine portion 8. First exhaust ports 117 and 118 include similar geometry. Second exhaust port 120 extends from a first end portion 139 to a second end portion 140 defining an opening (also not separately labeled) having a third area for passing exhaust gases to exhaust path 14. In accordance with an aspect of the exemplary embodiment, the second area is smaller than both the first area and the third area. The third area is smaller than, the first area. The size of the first area may provide enhanced scavenging of combustion gases from piston cylinder 20.

In the exemplary aspect shown, the first area is larger than both or each of the second area and the third area. In further accordance with the exemplary aspect shown, the first area may be two-times the size, or more, than the third area. First exhaust ports 116-118 are arranged at a first distance from cylinder head 30. Second exhaust ports 120-122 are arranged at a second distance from cylinder head 30 that is greater than the first distance. In a manner similar to that described above, first exhaust ports 116-118 are exposed before second exhaust ports 120-122. In this manner, first exhaust ports 116-118 deliver exhaust/combustion gases at a first pressure to turbine portion 8. When uncovered, second exhaust ports 120-122 guide a second portion of exhaust/combustion gases at a second pressure that is lower than the first pressure directly to exhaust path 14.

Figure 3:
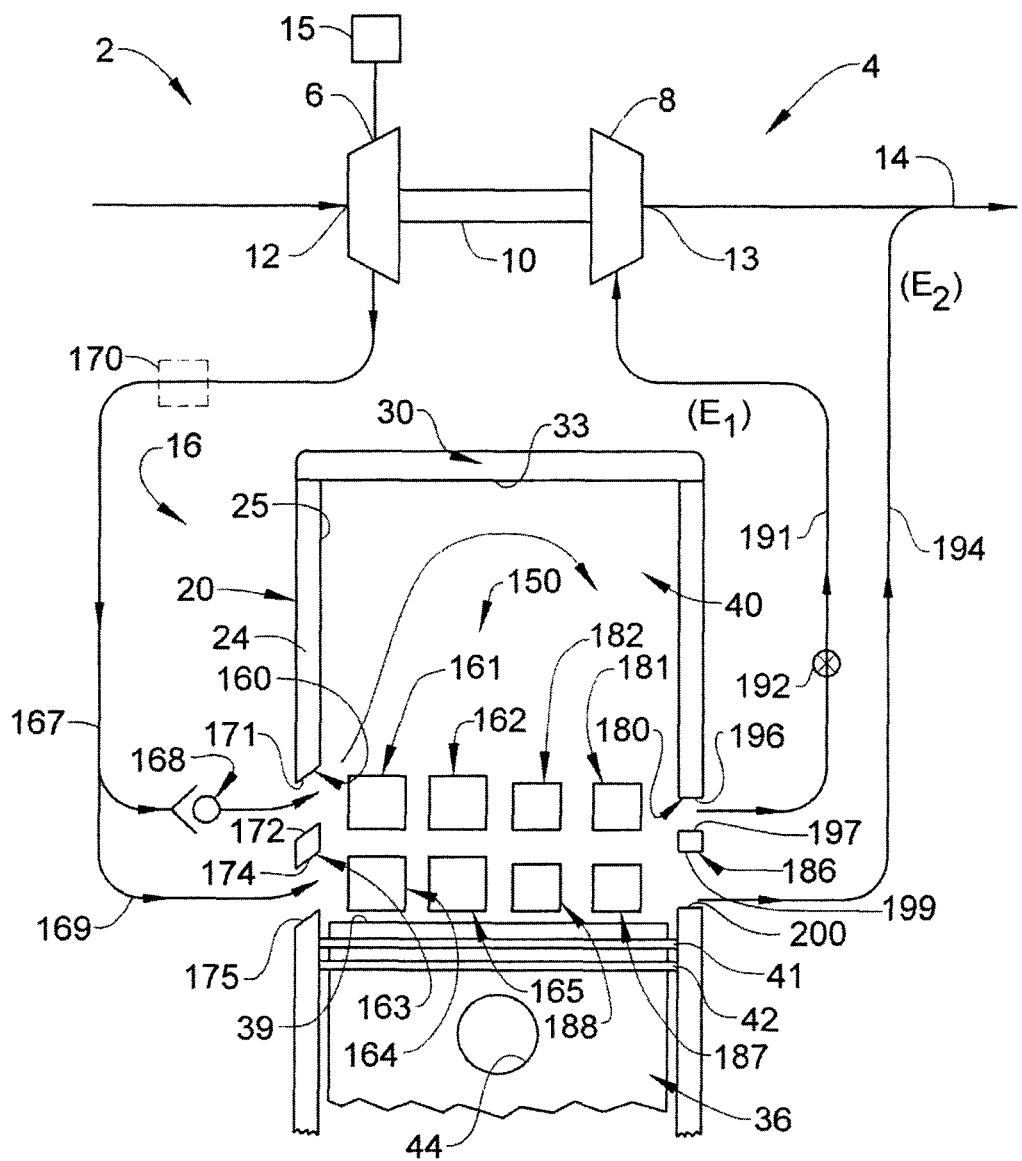
FIG. 3 depicts a schematic plan view of a porting system for a turbo-charged loop scavenged two-stroke diesel engine in accordance with yet another aspect of the exemplary embodiment.

Reference will now follow to FIG. 3, wherein like reference numbers represent corresponding parts in the respective views, in describing a porting system 150 in accordance with another aspect of the exemplary embodiment. Porting system 150 includes a plurality of first inlet ports, three of which are shown at 160, 161 and 162, and a plurality of second inlet ports 163, 164 and 165. First inlet ports 160-162 are spaced a first distance from cylinder head 30 and fluidically connected to a first inlet passage 167 having a one-way check valve 168. Second inlet ports 163-165 are spaced a second distance, that is greater than the first distance, from cylinder head 30 and fluidically connected to a second inlet passage 169. Second inlet passage 169 fluidically connects to first inlet passage 167 downstream from check valve 168. First and second inlet passages 167 and 169 are fluidically connected to compressor portion 6 and deliver compressed air into piston cylinder 20. Inlet passage 167 may include an intercooler 170. If provided, intercooler 170 lowers a temperature of air passing from compressor portion 6 into piston cylinder 20 via first and second inlet passages 167 and 169. First inlet port 160 extends from a first end 171 to a second end 172 defining an opening (not separately labeled) having a first area for inputting compressed air and fuel. First inlet ports 161 and 162 include similar geometry. Second inlet port 163 extends from a first end 174 to a second end 175 defining an opening (not separately labeled) having a second area for guiding compressed air into piston cylinder 20. Porting system 150 also includes a plurality first exhaust ports, three of which are indicated at 180, 181 and 182 and a plurality of second exhaust ports, three of which are indicated at 186, 187 and 188.

In accordance with the exemplary aspect shown, first exhaust ports 180-182 are fluidically connected to a first exhaust passage 191 which is fluidically connected to turbine portion 8. In accordance with an aspect of the exemplary embodiment, first exhaust passage 191 may be provided with a valve 192. Valve 192 is selectively closed to provide additional compression particularly during start-up of turbo-charged loop scavenged two-stroke diesel engine 2. Second exhaust ports 186-188 are fluidically connected to a second exhaust passage 194 that bypasses turbine portion 8. First exhaust port 180 extends from a first end portion 196 to a second end portion 197 defining an opening (not separately labeled) having a third area for passing exhaust gases to turbine portion 8. First exhaust ports 181 and 182 include similar geometry. Second exhaust port 186 extends from a first end portion 199 to a second end portion 200 defining an opening (also not separately labeled) having a fourth area for passing exhaust gases to exhaust path 14. In accordance with an aspect of the exemplary embodiment, the third area is smaller than first, second and fourth areas.

In the exemplary aspect shown, first exhaust ports 180-182 are arranged at a first distance from cylinder head 30. Second exhaust ports 186-188 are arranged at a second distance from cylinder head 30 that is greater than the first distance. First inlet ports 160-162 are uncovered before second inlet ports 163-165. First inlet ports 160-162 introduce fuel/air into piston cylinder 20. Second inlet ports 163-165 enhance scavenging of exhaust/combustion gases to improve operating efficiency of turbo-charged loop scavenged two-stroke diesel engine 2. In a manner similar to that described above, first exhaust ports 180-182 are exposed before second exhaust ports 186-188. In this manner, first exhaust ports 180-182 deliver exhaust/combustion gases at a first pressure to turbine portion 8. When uncovered, second exhaust ports 186-188 guide a second portion of exhaust/combustion gases at a second pressure that is lower than the first pressure directly to exhaust path 14.

Figure 4:
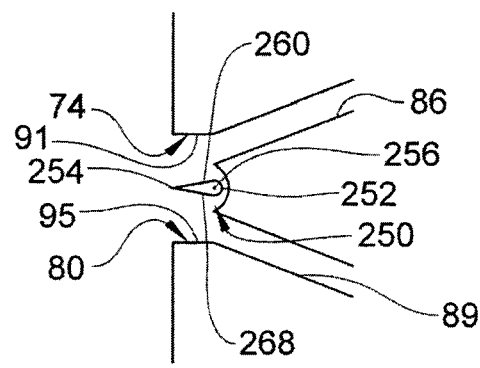
FIG. 4 is a partial plan view of adjustable exhaust ports in accordance with an aspect of the exemplary embodiment.

In accordance with another aspect of the exemplary embodiment, turbo-charged loop scavenged two-stroke diesel engine 2 may include an adjustable wall member 250 arranged between first and second exhaust ports 74 and 80 as shown in FIG. 4. Adjustable wall member 250 extends from a first end section 252 to a second end section 254. First end section 252 is configured to pivot about an axis 256. Adjustable wall member 250 is shown to include first and second surfaces 260 and 268 that taper from first end section 252 to second end section 254. Adjustable wall member 250 selectively pivots to guide exhaust gases into first and second exhaust passages 86 and 89 to enhance output performance of two-stroke diesel engine 2. While shown as having tapering surfaces, adjustable wall member 250 may also include a constant cross-section. Also, while shown as pivoting about an end, adjustable wall member 250 may also translate linearly within turbo-charged loop scavenged two-stroke diesel engine 2.

At this point it should be understood that the exemplary embodiments describe a porting system for a turbo-charged loop scavenged two-stroke diesel engine that guides exhaust/combustion gases having a momentum conducive to driving a turbine portion of a turbo-charger while allowing exhaust/combustion gases having a lower momentum directly to an exhaust path. In this manner, gases at the lower momentum that could create a back pressure at the turbine are allowed to flow freely from the piston cylinder. The reduction/elimination of back pressure at the turbine portion increases an overall operating efficiency of turbo-charged loop scavenged two-stroke diesel engine. It should also be understood that the number and arrangement of inlet ports, first exhaust ports and second exhaust ports may vary. Further, it should be understood that while described in connection with a diesel engine, the exemplary embodiments may also be employed with other forms of two-stroke engines.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A porting system for a turbo-charged loop scavenged two-stroke engine comprising: a cylinder including a cylinder wall and a cylinder head; at least one inlet port provided in the cylinder wall, the at least one inlet port including a first area being arranged a first distance from the cylinder head and fluidically connected to a compressor portion of a turbo-charger; a first exhaust port having a second area provided in the cylinder wall, the first exhaust port being arranged a second distance from the cylinder head and fluidically connected to a turbine portion of the turbo-charger through a first exhaust passage; and a second exhaust port having a third area that is larger than the second area provided in the cylinder wall, the second exhaust port being arranged a third distance from the cylinder head that is greater than the second distance, the second exhaust port being fluidically connected to a second exhaust passage bypassing the turbine portion.

2. The porting system according to claim 1, wherein the second distance is less than the first distance.

3. The porting system according to claim 1, wherein the first area is greater than the third area.

4. The porting system according to claim 3, wherein the first area is about two-times larger than the third area.

5. The porting system according to claim 1, wherein the at least one inlet port extends from a first end toward a second end and the second exhaust port extends from a first end portion to a second end portion, the second end and the second end portion being about equally spaced from the cylinder head.

6. The porting system according to claim 1, wherein the at least one inlet port includes a first inlet port provided in the cylinder wall arranged at the first distance from the cylinder head and a second inlet port provided in the cylinder wall arranged at a fourth distance from the cylinder head, the fourth distance being less than the first distance.

7. The porting system according to claim 1, further comprising: an adjustable wall member arranged between the first and second exhaust ports.

8. A method of operating a turbo-charged loop scavenged two-stroke engine comprising: passing a first portion of exhaust gases at a first pressure through a first exhaust port having a first area formed in a cylinder wall of a cylinder; guiding the first portion of the exhaust gases to a turbine portion of a turbo-charger through a first exhaust passage; passing another portion of the exhaust gases at a second pressure lower than the first pressure through a second exhaust port having a second area that is larger than the first area formed in the cylinder wall; and guiding the second portion of the exhaust gases through second exhaust passage bypassing the turbine portion.

9. The method of claim 8, wherein passing the first portion of exhaust gases through the first exhaust port includes passing the first portion of exhaust gases through the first exhaust port spaced a first distance from a cylinder head of the cylinder and wherein passing the second portion of exhaust gases through the second exhaust port includes passing the second portion of exhaust gases through the second exhaust port spaced a second distance from the cylinder head, the second distance being greater than the first distance.

10. The method of claim 8, further comprising: shifting an adjustable wall member arranged between the first and second exhaust ports.

11. The method of claim 8, further comprising: guiding compressed air into the cylinder from a compressor portion of the turbo-charger.

12. The method of claim 11, wherein guiding compressed air into the cylinder includes passing a first portion of compressed air into the cylinder through the first inlet port formed in the cylinder wall a first distance from a cylinder head of the cylinder, and a second portion of compressed air through the second inlet port formed in the cylinder wall a second distance from the cylinder head, the second distance being greater than the first distance.

13. A turbo-charged loop scavenged two-stroke engine comprising: a turbo-charger including a compressor portion and a turbine portion, the turbine portion being fluidically connected to an exhaust path; an engine block including a piston cylinder fluidically connected to the turbo-charger, the piston cylinder having a cylinder wall and a cylinder head that define, at least in part, a combustion chamber; a piston slidingly arranged within the piston cylinder; a porting system provided in the cylinder wall, the porting system comprising: at least one inlet port having a first area provided in the cylinder wall, the at least one inlet port being arranged a first distance from the cylinder head and fluidically connected to the compressor portion; a first exhaust port having a second area provided in the cylinder wall, the first exhaust port being arranged a second distance from the cylinder head and fluidically connected to the turbine portion through a first exhaust passage; and a second exhaust port having a third area that is larger than the second area provided in the cylinder wall, the second exhaust port being arranged a third distance from the cylinder head that is greater than the second distance, the second exhaust port being fluidically connected to a second exhaust passage bypassing the turbine portion.

14. The turbo-charged loop scavenged two-stroke engine according to claim 13, wherein the second distance is less than the first distance.

15. The turbo-charged loop scavenged two-stroke engine according to claim 13, wherein the first area is greater than the third area.

16. The turbo-charged loop scavenged two-stroke engine according to claim 13, wherein the at least one inlet port extends from a first end toward a second end and the second exhaust port extends from a first end portion to a second end portion, the second end and the second end portion being about equally spaced from the cylinder head.

17. The turbo-charged loop scavenged two-stroke engine according to claim 13, wherein the at least one inlet port includes a first inlet port provided in the cylinder wall arranged at the first distance from the cylinder head and a second inlet port provided in the cylinder wall arranged at a fourth distance from the cylinder head, the fourth distance being less than the first distance.

18. The turbo-charged loop scavenged two-stroke engine according to claim 13, further comprising: an adjustable wall member arranged between the first and second exhaust ports.

* * * * *